United States Patent
Issing et al.

(10) Patent No.: US 11,651,463 B2
(45) Date of Patent: May 16, 2023

(54) SYSTEM AND METHOD FOR PICKING AND DELIVERING OF ARTICLES FROM AN ONLINE SUPERMARKET

(71) Applicant: SSI Schäfer Automation GmbH, Giebelstadt (DE)

(72) Inventors: Elmar Issing, Giebelstadt (DE); Christian Herzmaier, Würzburg (DE); Jakob Beer, Bad Harzburg (DE)

(73) Assignee: SSI Schäfer Automation GmbH, Giebelstadt (DE)

( * ) Notice: Subject to any disclaimer, the term of this patent is extended or adjusted under 35 U.S.C. 154(b) by 191 days.

(21) Appl. No.: 17/252,122

(22) PCT Filed: Jun. 12, 2019

(86) PCT No.: PCT/EP2019/065289
§ 371 (c)(1),
(2) Date: Dec. 14, 2020

(87) PCT Pub. No.: WO2019/238724
PCT Pub. Date: Dec. 19, 2019

(65) Prior Publication Data
US 2021/0327012 A1  Oct. 21, 2021

(30) Foreign Application Priority Data

Jun. 13, 2018 (DE) ..................... 10 2018 114 177.7

(51) Int. Cl.
*G06F 7/00* (2006.01)
*G06Q 50/28* (2012.01)
(Continued)

(52) U.S. Cl.
CPC ................ *G06Q 50/28* (2013.01); *B60P 1/36* (2013.01); *B60P 3/007* (2013.01); *B65G 1/1373* (2013.01);
(Continued)

(58) Field of Classification Search
CPC ............. G06Q 50/28; G06Q 10/06315; G06Q 10/083; B60P 1/36; B60P 3/007;
(Continued)

(56) References Cited

U.S. PATENT DOCUMENTS 10,577,180 B1 * 3/2020 Mehta ..................... B25J 9/162
2012/0298688 A1  11/2012 Stiernagle
(Continued)

FOREIGN PATENT DOCUMENTS

DE  29709545  8/1997
DE  29709547  8/1997
(Continued)

OTHER PUBLICATIONS

Office Action dated Apr. 3, 2019 in corresponding German Application No. 10 2018 114 177.7.
(Continued)

*Primary Examiner* — Yolanda R Cumbess
(74) *Attorney, Agent, or Firm* — Renner, Otto, Boisseile & Sklar, LLP

(57) ABSTRACT

It is disclosed a system and method for picking and delivering articles (14) in accordance with a plurality of orders from customers (24), wherein the orders comprise pouchable article (14) of an online supermarket, which have been ordered by the customers (24), comprising the steps of: providing a storage and order-picking installation (11), in which the articles (14) of the online supermarket are stored in, preferably different, storage and picking areas (12); filling pouches (16), in accordance with the orders, with the ordered articles (14) within the storage and picking areas (12); coupling the pouches (16) to an overhead conveyor (22); handing over the filled pouches (16) to a delivery vehicle (20) configured to transport the pouches (16) in a hanging manner; transporting the hanging pouches (16) with
(Continued)

the delivery vehicle (20) to the customers (24); determining a delivery tour by means of a controlling device (28), wherein the delivery tour defines a sequence in which the customers (24) are delivered by the delivery vehicle (20), in order to hand over to the customers (24) the pouches (16) including the articles (14), which have been ordered by the customers (24); and sorting the filled pouches (16) in accordance with the delivery route by means of the overhead conveyor (22).

15 Claims, 6 Drawing Sheets

(51) Int. Cl.
| | | |
|---|---|---|
| *B60P 1/36* | (2006.01) | |
| *B60P 3/00* | (2006.01) | |
| *B65G 1/137* | (2006.01) | |
| *B65G 17/20* | (2006.01) | |
| *B65G 17/32* | (2006.01) | |
| *B65G 47/26* | (2006.01) | |
| *G05B 15/02* | (2006.01) | |
| *G05D 1/02* | (2020.01) | |
| *G06Q 10/0631* | (2023.01) | |

(52) U.S. Cl.
CPC ............ *B65G 17/20* (2013.01); *B65G 17/32* (2013.01); *B65G 47/26* (2013.01); *G05B 15/02* (2013.01); *G05D 1/0217* (2013.01); *G06Q 10/06315* (2013.01); *G05D 2201/0216* (2013.01)

(58) Field of Classification Search
CPC ......... B60P 1/00; B65G 1/1373; B65G 17/20; B65G 17/32; B65G 47/26; B65G 1/00; G05B 15/02; G05D 1/0217; G05D 2201/0216
USPC ................. 700/213, 216–218, 223, 228, 230
See application file for complete search history.

(56) References Cited

U.S. PATENT DOCUMENTS

| | | | |
|---|---|---|---|
| 2015/0006005 A1 | 1/2015 | Yu | |
| 2019/0233213 A1* | 8/2019 | Phan-Quiroga | B65G 1/0492 |
| 2022/0097588 A1* | 3/2022 | Ulsamer | B66C 1/36 |

FOREIGN PATENT DOCUMENTS

| | | |
|---|---|---|
| DE | 102011015138 | 9/2012 |
| DE | 102011101987 | 11/2012 |
| DE | 102012018925 | 3/2014 |
| DE | 102012019717 | 4/2014 |
| DE | 102015118832 | 1/2017 |
| DE | 102016009563 | 11/2017 |
| EP | 2766285 | 4/2017 |
| EP | 2766285 B1 | 4/2017 |
| EP | 2872424 | 6/2017 |
| EP | 2872424 B1 | 6/2017 |
| EP | 2714552 | 3/2020 |
| GB | 2215699 | 3/1989 |
| WO | 2012/163780 | 6/2012 |
| WO | 2013053747 | 4/2013 |
| WO | 2014009257 | 1/2014 |
| WO | 2014009257 A2 | 1/2014 |
| WO | 2016122754 | 8/2016 |
| WO | 2017164914 | 9/2017 |
| WO | 2018112490 | 6/2018 |
| WO | 2010012364 | 2/2020 |

OTHER PUBLICATIONS

Summons to the hearing mailed Nov. 30, 2020 in corresponding German Application No. 10 2018 114 177.7.

Decision to Grant dated Apr. 28, 2022 in corresponding German Application No. 10 2018 114 177.7.

Gear sequence (Gangfolge) In: Wikipedia, the free Encyclopedia, Editing status: Nov. 20, 2013 at 03:47 PM, URL: https://de.wikipedia.org/w/index.php?title=Gangfolge&oldid=124667128 [retrieved on Mar. 26, 2019].

International Search Report and Written Opinion for corresponding International Application No. PCT/EP2019/065289 dated Jul. 17, 2019.

* cited by examiner

SYSTEM AND METHOD FOR PICKING AND DELIVERING OF ARTICLES FROM AN ONLINE SUPERMARKET

This application is a national phase of International Patent Application No. PCT/EP2019/065289 filed on Jun. 12, 2019, which claims priority to German Patent Application No. 10 2018 114 177.7 filed on Jun. 13, 2018, all of which are hereby incorporated herein by reference.

The present invention relates to a system and method for picking and delivering of articles in accordance with a plurality of orders from customers which comprise pouchable articles of an online food retailer, or an online supermarket, such as fruits and vegetables, dairy products, meat and sausage, (deepfreeze or) cooled products, beverages, drugstore articles, electronic products, and/or household articles), and which are ordered by different (end) customers, preferably online. These orders from customers will be referred to hereinafter as customer order (or briefly as orders only). The invention further relates to a delivery vehicle.

In particular, the invention relates to aspects of both intralogistics and general logistics.

The aspect of intralogistics is to be seen in the consolidation of articles in accordance with customer orders in a storage and picking installation. The general logistic aspect is to be seen in the delivery of articles, which have already been picked, by means of a delivery vehicle from the storage and picking installation to the end customer ("home delivery"), or to transfer stations (i.e., automatic stations for handing over goods to be picked up by the end customer himself, such as "Tower24"). Particularly, the invention is used in the field of the so-called "E-Grocery".

Even today it is possible to order articles of a supermarket online, and get the ordered articles home-delivered at a desired time, or alternatively to a transfer station.

In this context, the picking (retrieval from storage location and delivery to target location, such as an order container assigned to the ordering customer) occurs in conventional storage and picking systems 100, one of which is schematically illustrated in FIG. 6. The picking and (later) delivering, wherein beverages and bulky goods are excluded, happens continuously in transport boxes.

FIG. 6 will be described in more detail below for explaining the environment in which the present invention is located. In FIG. 6 also functional aspects are illustrated besides structural components of the conventional system 100.

The articles of the assortment of the online supermarket are delivered to a goods-receipt area 102, and distributed, dependent on the type of article, to different storage and picking areas 104, as indicated by light (vertical) arrows in FIG. 6. Within the storage and picking areas are indicated exemplarily racks 106, pickers 108, and picking vehicles 110. The areas 104 are separated (spatially and functionally) from each other, dependent on the types of articles.

In general, typical areas 104 of an online supermarket are: articles of value ("value", such as cigarettes); a dry assortment ("DryAs" such as flour and sugar); cosmetics; issue (e.g., household goods); bread; dairy products ("DaiPro", such as milk, cheese and the like); fruits and vegetables ("F&V"), sausage products ("counter"); deep-freeze products ("DP"); and beverages.

Articles from the areas dairy products, fruits and vegetables, and counter are typically picked into and transported in cooled boxes, or refrigerating containers, 112. Articles from the area of deep-freeze products are picked into and transported in deep-freeze boxes 114.

Beverages do not need to be picked separately because of being typically transported directly in a load carrier thereof (e.g., beverage box).

When one customer order includes articles from different areas 104, the corresponding order is divided into partial orders (boxes) for being picked in the associated areas. Partial orders from the areas of dry assortment, cosmetics, Issues, bread, dairy products, and fruits and vegetables will be consolidated, i.e. merged, later in an area 116, and sorted according to customers. Subsequently, these articles are consolidated with the partial orders from the remaining areas 104 in a (shipping) area 118, and sorted according to tours.

Subsequently, the articles, which mainly have been picked completely, are delivered (in a tour-dependent manner) in the boxes, as indicated by a block 120 in FIG. 6. The delivery 120, where the articles are delivered to the end customer, is possibly associated with a new picking and consolidation of articles from the areas 104 of the deep-freeze and cooled products. This means that the driver of the delivery vehicle (not shown) brings together all articles, which do not need to be cooled, with the articles of one order, which need to be cooled. This happens at the time of retrieval from the vehicle by transferring the articles from the boxes into, for example, one or more bags.

The block 120 can also include taking-back and taking-away empties by the driver.

Afterwards, the empties, such as beverage boxes and the empty picking and transport boxes, are transported back. Then, the transport boxes need to be cleaned. Cooling aggregates need to be taken out in order to be cooled again. Empty beverage boxes are returned to a sorting process for empties, and then send back to the beverage manufacturer.

The system 100 has the following drawbacks.

Synchronization of different pre-picked partial orders from the different areas 104 is difficult up to impossible. Multiple consolidations must be performed frequently at different locations, i.e., different partial orders need to be merged again and again. Compaction of the picked articles lacks. This means that the articles are frequently delivered in transport receptacles, which are not completely filled.

The consolidation and compaction of the picked articles is also discussed in EP 2 872 424 B1. A system and method for operators of an online supermarket is disclosed there, wherein the customers pick up their orders directly at the storage and picking installation.

Changes of the customer orders and changes of the delivery tours are difficult to realize in e-commerce. The change of a tour means that, for example, one customer which is to be delivered on a first tour shall be transferred from the first tour to a second tour. This customer may be located, for example, exactly at the border of two delivery areas. A retrospective optimization of the tour could result in that it would be better to deliver the customers during the second tour.

Even today, moving transport containers (not illustrated) on the picking vehicle 110 through the areas 104 is usual. These transport containers can be loaded with (customers) bags which are handed over to the customer at the end of the delivery directly. One drawback is that very much space is given away within the transport containers because each transport container always holds bags of one single customer only.

Another drawback of this type of picking is to be seen in that different transport containers are used, resulting in reloading processes which cost time.

For ensuring a flawless picking process both the articles and the used picking elements, such as the picking vehicles 110, are very frequently scanned multiple times.

The picking paths (walking path) can be very long.

These are all reasons that the picking process is relatively inefficient. A further contribution is that the transport containers need to be labelled multiple times (tour, customer, etc.). The sorting according to customers and tours is work-intense.

The reloading of the articles at the delivery-end point by the driver of the delivery vehicle is time consuming, but unavoidable, because deep-freeze articles and non-cooled articles need to be brought together.

Therefore, it is an object of the present invention to provide an improved system and method for picking and delivering articles of an online supermarket.

This object is solved by a method for picking and delivering articles in accordance with a plurality of orders from customers, wherein the orders comprise pouchable article of an online supermarket, which have been ordered by the customers, comprising the steps of: providing a storage and picking installation in which the articles of the online supermarket are stored in, preferably different, storage and picking areas; filling pouches with the ordered articles in the storage and picking areas in accordance with the orders; coupling the pouches to an overhead conveyor; handing over the filled pouches to a delivery vehicle configured to transport the pouches in a hanging manner; transporting the hanging pouches, by means of the delivery vehicle, to the customers; determining a delivery tour by means of a controlling device, wherein the delivery tour defines a sequence in which the customers are delivered by the delivery vehicle in order to hand over to the customers the pouches including the articles, which have been ordered by the customers; and sorting the filled pouches according to the delivery tour by means of the overhead conveyor.

The above-described method distinguishes in that the ordered articles are touched as less as possible (one-touch strategy). In particular, this means that the articles are only touched during the filling of the pouches actually. Subsequently, reloading processes preferably do not occur any more. Further, this means in particular that reloading neither occurs in the installation, nor is performed by the driver of the delivery vehicle. The articles are already located in the pouches, which are then actually also handed over to the customers later. The picking into boxes and the subsequent reloading of the articles into pouches, or bags, is omitted.

The use of pouches simplifies sorting processes. One of the sorting processes is performed based on the delivery tour. When the pouches are retrieved from the delivery vehicle by the driver of the delivery vehicle, the pouches assigned to the current customer should be ready as a group at the latest. This means that the driver does not need to check all of the pouches in the vehicle. The pouches, which are currently needed, are provided directly, for example, at a retrieval opening of the vehicle. The required sorting process is conducted at the latest during the drive from the installation to the customer. It goes without saying that, alternatively, this sorting process can be conducted already in the installation itself.

A further sorting process conducted in the installation allows the assignment and allocation of the pouches, and thus also of the orders, to specific delivery vehicles. Each of the delivery vehicle gets assigned to a delivery area, or a delivery route, where a group of specific customers is located. With other words, each of the delivery vehicles has assigned a fixed group of customers which makes it necessary to distribute the pouches within the installation onto the vehicles so that the delivery vehicles can be loaded correspondingly.

A further advantage is to be seen in the consolidation. The pouches can be merged automatically, by means of the overhead conveyor, from the different storage and picking areas within a collecting area, in order to be arranged there in accordance with the above-described sorting processes. Cooled goods remain, for example, in a cooled picking area until briefly before the delivery.

Sorting and/or compaction processes can be conducted in both the installation and delivery vehicle. The ordered articles are handled, preferably only, in the hanging pouches. Hanging pouches can be compacted at maximum by pushing together the pouches in a contacting manner. A corresponding compaction is not possible, for example, by means of conventional containers. If the container is not completely filled, space is lost with the classic approach.

Further, it is preferred that the overhead conveyor comprises a driven overhead-conveying system within the delivery vehicle which performs the step of sorting the filled pouches according to the delivery tour.

In this case the pouches, which belong to one delivery tour, can be handled chaotically within the installation. In particular, the pouches can be transferred in a chaotic sequence to the delivery vehicle. The delivery vehicle arranges the pouches according to the sequence in which the customers are delivered. This is expressed by time savings because sorting is not conducted within the installation.

Moreover, it is advantageous that the pouches are transported in a hanging manner through the installation while the pouches are filled with the articles according to the customer orders, and/or while the pouches are handed over to the delivery vehicle.

With other words, the pouches are always used in a hanging manner within the installation. The pouches are filled in a hanging state. The pouches are handed over to the delivery vehicle in a hanging state. As a result, the pouches are transported permanently by means of the overhead conveyor. The picker (packer) within the installation does not need to carry the pouches. Also, the pouches do not need to be reloaded between different transporting receptacles. The pouches can be transported automatically during all steps of the process.

With a further particular embodiment the step of coupling the pouches to the overhead conveyor occurs just when the filled pouches are handed over to the delivery vehicle.

This embodiment allows operating existing storage and picking installations, which are not provided with overhead conveyors, in accordance with the invention. In this case the pouches can be moved in a standing manner, for example, in transport receptacles through the installation, in particular for filling the articles into the pouches. Then, the filled pouches can be transported in the transporting receptacles to the delivery vehicle for being stored there automatically, or manually, in a hanging manner into the delivery vehicle.

Also, as mentioned above, it is advantageous that the pouches within the installation are sorted further to different delivery vehicles being assigned to different delivery tours.

With another preferred embodiment only one single type of pouches is used in all steps, wherein the type of pouches can be coupled, preferably via an adapter, in particular via a hanger, a loop or the like, to the overhead conveyor.

This embodiment allows using (one-way, or multiple way) bags as the pouches, which are later handed out to the customer and stay with the customer. Thus, overhead-conveyor-specific pouches are not used, but conventional bags are used which are cheap and which can be left to the customers.

The above-mentioned object is further solved by a system for picking and delivering articles in accordance with a plurality of orders from customer, wherein the orders comprise pouchable articles of an online supermarket, which have been ordered by the customers, and wherein the system comprises: a storage and picking installation comprising at least one storage and picking area where pouches are filled with ordered articles according to the orders; an overhead conveyor for sorting the filled pouches according to a delivery tour; at least one delivery vehicle configured to transport the pouches in a hanging manner; and a controlling device configured to determine the delivery tour, wherein the delivery tour defines a sequence in which the customers are delivered by the delivery vehicle for handing over to the customers the pouches including the articles, which have been ordered by the customers.

The advantages mentioned in connection with the method are valid for the system in an analogous manner.

Preferably, the overhead conveyor comprises a driven, in particular closed, overhead-conveying system within the delivery vehicle.

Further, it is advantageous that the overhead conveyor is provided within the installation, in particular in the at least one storage and picking area.

In this case the picker does not need to carry the pouches. During the filling process the pouches are already hanging in the overhead conveyor. Thereby ergonomics are enhanced for the picker. Sorting and/or consolidating processes can be automated.

In addition, typical picking strategies, such as the man-to-goods principle, can be applied optimally. Picking can be performed in a batch-oriented manner.

Even the later merging of the pouches, which belong to the same order and originate from different storage and picking areas, is simple and automated. Reloading processes are avoided. Sorting processes can be integrated.

In another particular embodiment the overhead conveyor in the installation comprises a driverless transport system including driverless transport vehicles, wherein the driverless transport vehicles are configured to transport the pouches in a hanging manner.

Existing installations, which are not provided with classic, e.g. ceiling-guided, overhead conveyors, can be retrofitted in a simple manner. The courses, and/or the space, of existing conveying systems can be used for the driverless transport system so that the above described advantages can be realized.

In particular, the overhead conveyor is configured to couple the pouches via adapters, wherein the pouches preferably are bags, and in particular one-way bags.

Preferably, the pouches alternatively are multi-way bags, which preferably comprise an integrated cooling system.

Further, a delivery vehicle is proposed which comprises a driven overhead-conveying system, and is configured to be operated in the above-described system.

It is clear that the above-mentioned and hereinafter still to be explained features cannot be used in the respectively given combination only, but also in different combinations or alone, without departing from the scope of the present invention.

Embodiments of the invention are illustrated in the drawings, and will be explained in more detail in the following description.

The present invention relates to a system 10 and method for picking and delivering articles 14 according to a plurality of orders from customers which comprise "pouchable" articles 14 of an online food retailer, or an online supermarket, such as fruits and vegetables, dairy products, meat and sausage, (deep-freeze or) cooled products, beverages, drugstore articles, and/or household articles, and which are deposited by different (end) customers, preferably online via the Internet. The orders from customers will be referred to hereinafter also as customer orders (or briefly as orders only).

Figure 1:
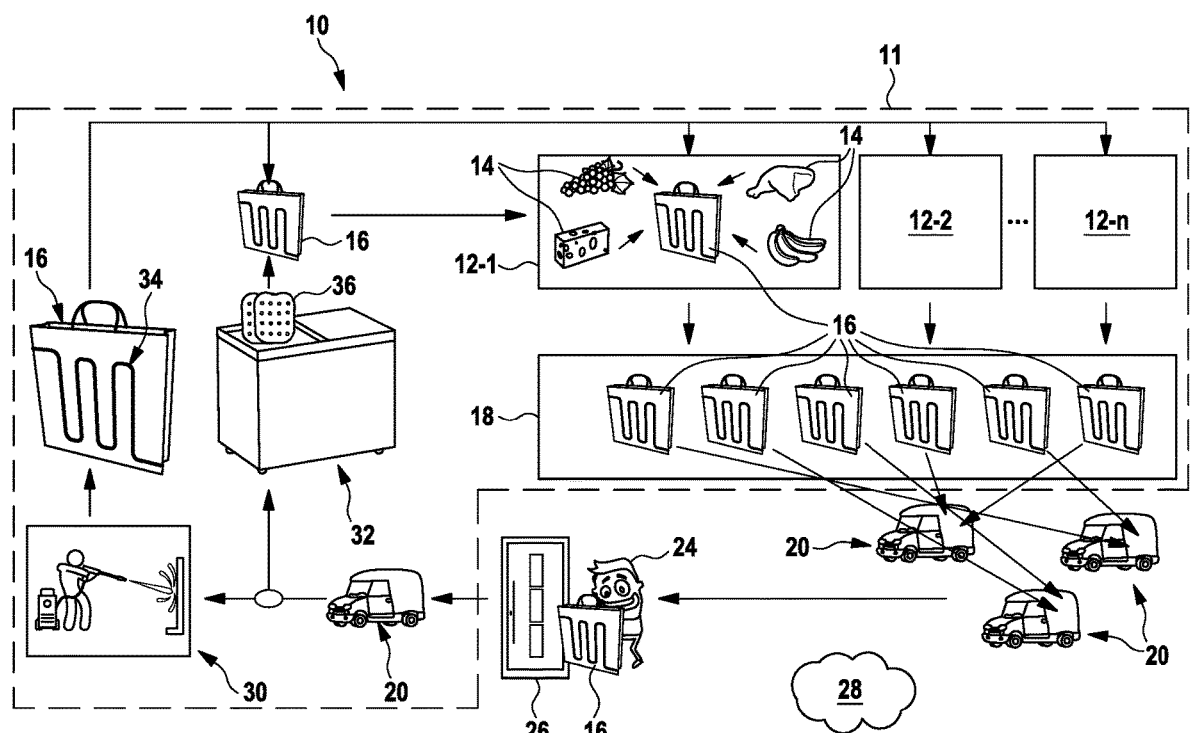
FIG. 1 shows a schematic configuration and process diagram of a system and method for picking and delivering articles of a supermarket ordered online.

FIG. 1 shows a schematic configuration and process diagram for illustrating the present invention.

Figure 6:
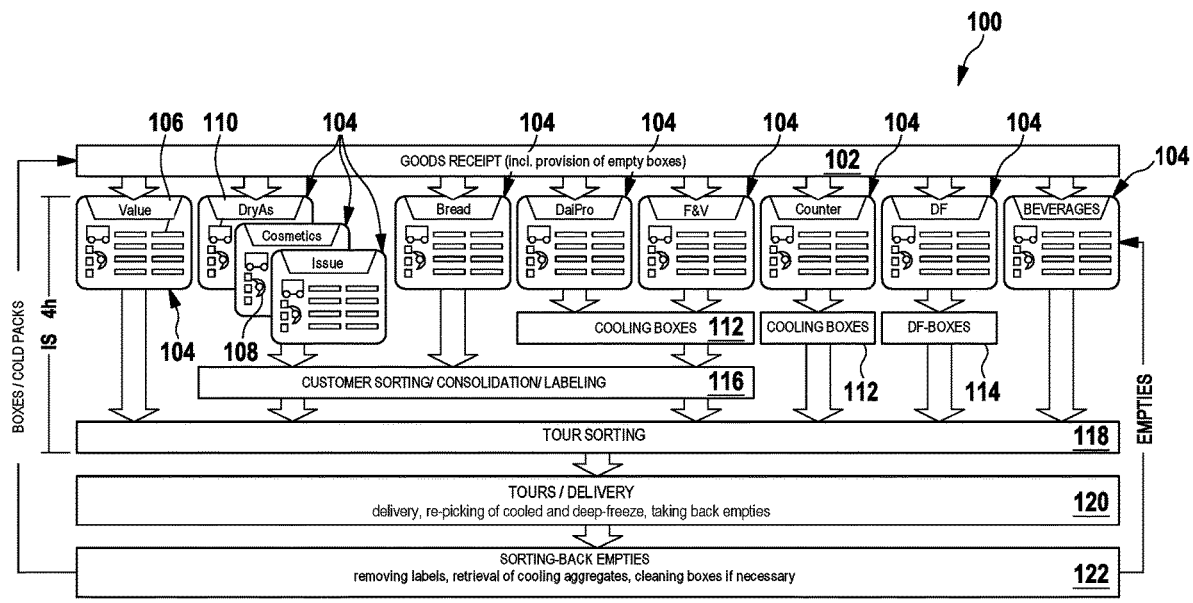
FIG. 6 shows a configuration and process diagram of a conventional system and a conventional method for picking and delivering articles of a supermarket.

It is shown a system 10 including a storage and picking installation 11, which will also be referred hereinafter briefly as installation 11. The installation 11 comprises at least one storage and picking area 12. The storage and picking areas 12, which can be formed like the areas 104 of the system 100 of FIG. 6, typically are arranged separately to each other. However, the areas 12 can also be directly adjacent to each other.

In FIG. 1 the system 10 exemplarily comprises n storage and picking areas 12, wherein n is an integer larger than 1. However, it is clear that also one single area 12-1 can be provided only.

In general, all "pouchable" articles 14 are picked into pouches 16 (cf. also FIG. 2), whereas non-pouchable articles, as far as being present in the assortment of articles at all, can be picked conventionally.

The term "pouchable" expresses that the articles 14 are dimensioned such that the articles 14 can be packed into a bag (not illustrated), or pouch 16, and can be transported therein. The bags, or pouches 16, are handed over, preferably directly, to a customer 24 at the end of the delivery process, i.e. without being (once more) reloaded into a delivery receptacle. In particular, the pouch 16 is the delivery receptacle itself, which is handed over to the customer 24, as will be explained below in more detail. An exemplary delivery receptacle is a bag, preferably made of bio plastics, which has, for example, a maximum load capacity of 2 to 10 kg and a size from 35×35×4 cm³ up to 50×40×5 cm³. Alternatively, paper or fabric bags can be used.

A bag, or pouch 16, is distinguished in comprising a sack-shaped receptacle, which is in particular open towards the top, and at least one bail. Different shapes, dimensions, and maximum load capacities are possible. The bags and pouches 16 can be provided with an identification marker (e.g., RFID tag) for allowing identification thereof, and for omitting to provide labels. In this case the pouches 16 can be read and tracked permanently within the installation 11, on the DTVs 42, and within the delivery vehicles 20.

In addition, the pouchable articles 14 have a weight which does not exceed the maximum load capacity of the delivery receptacle.

However, all articles which are not pouchable, such as beverage boxes, can also be handled in the system 10, as will be explained hereinafter in more detail.

The system 10 can further comprise an optional sorting area 18 for sorting the pouches 16 according to customers 24 (delivery tour) and/or delivery zones, or delivery regions. Hereinafter, sorting exclusively according to customers will be considered exemplarily. For this purpose, the orders are evaluated according to the customer addresses by means of a controlling device 28 for determining a delivery tour, i.e. a sequence of the deliveries, as optimal as possible. The sequence determines among a group of orders the customer who will be delivered first, and the customer who will be delivered last. Then, the delivery vehicle 20 drives correspondingly to the customers 24.

When a delivery tour is determined, preferred delivery times and the like can also be considered. Path and time optimizations are preferred.

The sorting according to customers can be conducted within the installation 11, and/or within the delivery vehicles 20, as will be explained hereinafter in more detail. However, sorting according zones or regions is conducted in the installation 10, i.e. before the articles 14 are loaded into one of the delivery vehicles 20, because the delivery vehicles 20 always deliver one specific region with the articles 14.

Similar to the conventional system 100 the articles 14 are picked within the installation 11 preferably in an "area-oriented" manner. This means that, for example, fruits and vegetables are picked in a first area 12-1, whereas cigarettes (value) are picked, for example, in a different second area 12-2. The articles 14 are retrieved during the picking process from storage spaces, and given into the pouches 16. In this manner the pouches 16 are filled.

It is clear that, dependent on an amount, dimension, and weight of the ordered articles 14 belonging to the one (single) order, one or more pouches 16 need to be filled. This is determined in advance by order management and order processing, which notifies this to the picker 108 (guidance of picker).

Subsequently, all filled pouches 16 belonging to the same customer 24 are sorted, i.e. merged. The merging is required if the order requires filling of several pouches 14, or if several orders (in parallel) are processed simultaneously within the installation.

Typically, a plurality of different orders is processed in parallel so that an order-oriented merging is required. It is clear that sorting is superfluous if all customer orders in the installation 11 would be processed successively. Nevertheless, even in this case, the pouches 16 originating from different areas 12 and belonging to the same customer 24 would need to be merged.

In addition, it may be required that the pouches 14 belonging to the same customer 24 are delivered in a specific (absolute) sequence (e.g., heavy articles first). This also makes sorting necessary.

After the pouches 16, which belong to the same customer 24, have been merged, these pouches 16 can be handed over to a delivery vehicle 20 so that the pouches 16 are stored in the delivery vehicle 20, preferably in a hanging manner.

Figure 2:
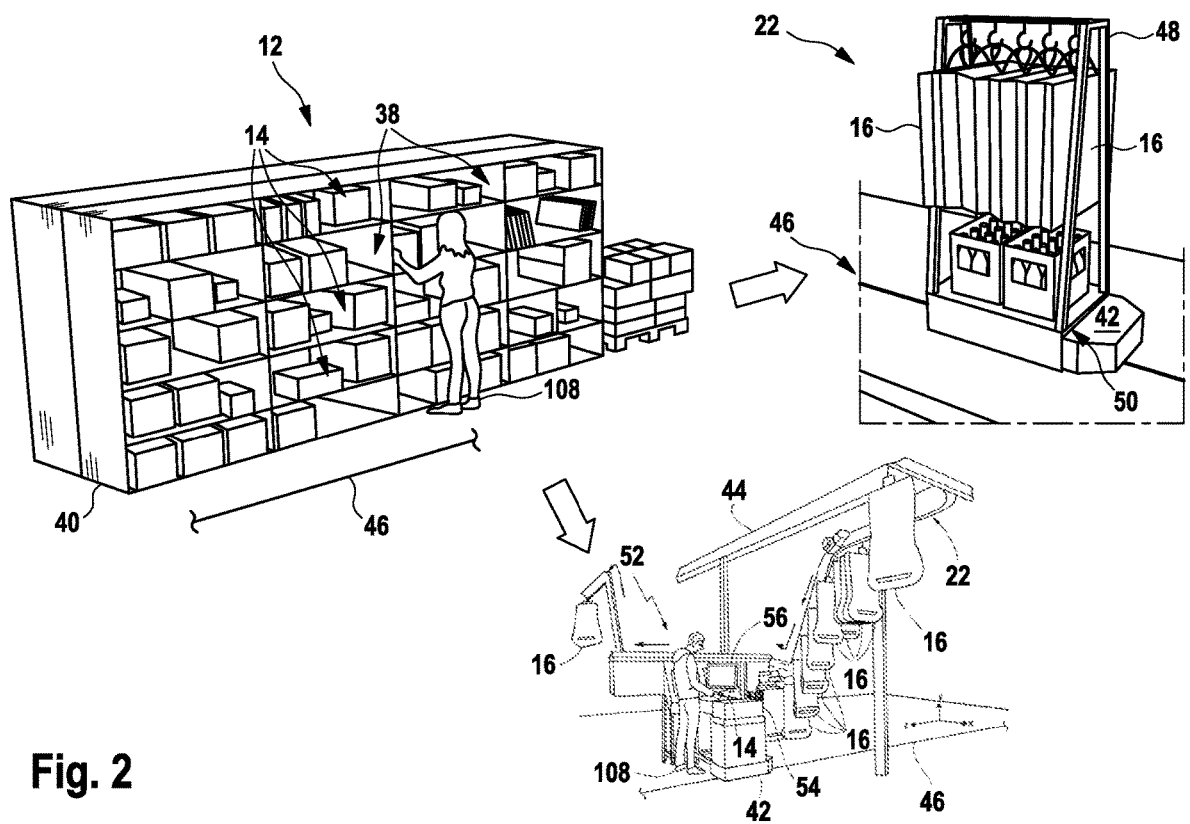
FIG. 2 shows a schematic illustration of a picking process utilizing an overhead conveyor for transporting the picked articles within a storage and picking area.

The delivery vehicle 20 comprises, for a hanging storage of the pouches 14, either (passive) buffering rails (not illustrated), and/or an (actively driven, closed) overhead conveyor 22 (cf. FIG. 2, at the lower right).

Returning to FIG. 1, then the pouches 16 are transported, as soon as the pouches 16 are hanging in the delivery vehicle 20, to the customers 24. The transport is performed by the delivery vehicles 20 on a direct path, i.e. without an intermediate stop in further distribution center (not shown) where a final sorting according to tours could occur. Alternatively, the delivery vehicle 20 can also drive to one of the above-mentioned transfer stations (not shown here) where the customers 24 can pick-up their orders themselves.

In FIG. 1 the transport of the pouches 16 is exemplarily conducted directly up to the door 26 of the customer 24. The driver 58 (cf. FIG. 3) of the delivery vehicle 20 retrieves the pouches 16 from the delivery vehicle 20, and hands them over to the customers 24 at their doors 26 ("home delivery"). Thus, it is about e-commerce between food retailers and private persons in particular.

As already mentioned above, the delivery tour is determined by the controlling device 28 which is illustrated in FIG. 1 as a cloud, and is part of the system 10 (and/or the installation 11). The controlling device 28 can be implemented by a centralized or distributed data-processing device. The controlling device 28 evaluates, e.g., the places of residence of the customers 24 in order to determine the delivery tour.

The controlling device 28 is further configured to conduct at least one of the following functions: warehouse management; order management and order processing; and material-flow control within the installation 11. The controlling device 28 is implemented by hardware and/or software. The controlling device typically includes at least one data-processing system.

Parts of the controlling device 28, or the controlling software, required for sorting can also be provided in the delivery vehicle(s) 20. Alternatively, the delivery vehicles 20 can be provided with its own controls.

Returning to FIG. 1 the pouches 16 filled with the articles 14 are sorted according to the delivery tour, preferably by a vehicle-internal overhead conveyor 22. This means that the driver 58 of the delivery vehicle 20, as soon as he arrives at the customer 24, gets presented the pouches 16 in the desired sequence at a retrieval opening 60 (cf. FIG. 3) of the delivery vehicle 20. Then, the driver 58 only needs to unhook these pouches 16, and hand them over to the customer 24. The driver 58 no longer needs to access the vehicle 58 and search the pouches 16 associated with the present customers 24. Also, the driver 58 no longer needs to reload the articles 14. For example, this means that the articles 14 no longer need to be taken out of boxes and reloaded into the delivery bags, which are then actually handed over to the customer 24. This also applies to (deep-freeze or) cooled goods, as will be explained below in more detail.

When the driver of the delivery vehicle 20 has delivered to all customers 24 of his delivery tour, he returns to the installation 11. In the installation 11 pouches 16, which have possibly been returned by the customer 24, can be cleaned in a cleaning station 30 of the installation 11, and/or cooled in a cooling device 32 (e.g., in a cold store).

For the purpose of cooling the pouches 16 preferably comprise either an integrated cooling system 34, which can be filled with a cooling liquid (not illustrated), or exchangeable cooling aggregates 36. If a cooling liquid is used, the pouches 16 can also be filled with a new cooling fluid depending on demand, preferably immediately before the filling with the articles 14 only. In FIG. 1 serpentine-shaped cooling lines are indicated which can be integrated into the pouches 16.

It is clear that both the cleaning station 30 and the cooling device 32 represent optional components of the installation 11.

FIG. 1 illustrates the system 10 and the processes for one single operator of an online supermarket. The shown systematics, however, can also be applied to a plurality of operators of online supermarkets, who respectively serve a plurality of customers. At least some customers 24 of one of the operators can be customers 24 of another one of the operators at the same time.

The different operators respectively operate their own storage and picking installation 11 and their own fleet of delivery vehicles 20. The picking of the articles 14 is conducted as generally described above and specifically described hereinafter. The manner of delivery is different.

The operator-specific delivery vehicles 20, however, do not drive directly to the customers 24, but deliver the pouches 16 to a distribution center (not illustrated). The distribution center is also equipped with an overhead conveyor 22 (DTV 42 and/or overhead conveying system 44) for automatically loading and unloading the pouches 16.

In the distribution center the pouches 16 of different operators can be sorted according to a common (operator-independent) delivery tour. This sorting (or delivery tour) is preferably based on path optimization. As many as possible customers 24 are to be delivered on a way as short as possible, independently of the fact where a customer 24 has put his order.

In this case tour optimizations (e.g., less stops for many customers 24) and clustering effects result. Delivery duration can be further shortened. The operators can share the costs of transportation. The operators can mark their pouches 16 in an operator-specific manner, and cause delivery by a "neutral" haulage company.

FIG. 2 exemplarily illustrates (single) one of the storage and picking areas 12 of FIG. 1. For example, the area 12 shown in FIG. 2 is operated manually. This means that one or more pickers 108 manually retrieve the articles 14, for example, from rack compartment 38 of rack 40, and give the retrieved article(s) 14 into one or more of the pouches 16.

The delivery of the articles 14 preferably occurs directly into the pouches 16, which are already hanging on the overhead conveyor 22 implemented in the upper right of FIG. 2 in terms of a driverless transport vehicle (DTV) 42, and in the lower right of FIG. 2 in terms of an (actively driven) overhead-conveying system 44. Alternatively, however, the articles 14 can also be given into pouches 16 being arranged in a standing or sitting manner, for example, within a transport receptacle (not shown) which can be positioned on a picking vehicle 110 (cf. FIG. 6).

In FIG. 2 the picking is performed manually. The picking is performed in accordance with the man-to-goods principle, if the articles 14 are handed over to the DTV 42, wherein the DTV 42 autonomously follows a traveling path 46 which, for example, can be adhered to the bottom along the rack 40. In this case the DTV 42 moves together with the picker 108 along the rack 40. It is clear that there are also variations of the DTV 42 which can navigate without an (optically recognizable) traveling track.

The DTV 42 is provided, for example, with a frame 48 for hanging-in the pouches 16. The frame 48 is configured to transport at the same time multiple pouches 16 in a hanging manner. Preferably, empty pouches 16 are hung in advance into the frame 48, wherein each of the hanging pouches 16 is assigned later to one of the customer orders (in terms of data), at the latest when a first article 14 is given into the empty pouch 16. It is clear that the pouches 16 can be provided in general with individually distinguishable identification features (bar code, RFID tag, etc.).

The DTVs 42 can further be configured to transport non-pouchable articles, for example, in a lower portion of the DTVs 42, on a transport area 50 of the DTV 42. In the upper right of FIG. 2, for example, two beverage boxes are shown on the transport area 50 of the DTV 42. The beverage boxes can be transported simultaneously with the pouches 16 by the DTV 42 through the area(s) 12.

Further, it is clear that the DTVs 42 can move, preferably autonomously, through the entire installation 11, and in particular through all areas 12.

Instead of a DTV 4, also the picker 108 can carry empty pouches 16 into which he gives the articles 14 in an order-oriented manner. As soon as one pouch 16 is full, the next pouch 16 is filled. Later, or immediately after the filling process the picker 108 can deliver the full pouch to an overhead conveyor 22.

It is clear that the picker 108 can be guided, during the man-to-goods-picking (upper right of FIG. 2), by the controlling device 28 in an order-oriented manner (and if necessary in a path-optimized manner) through the area(s) 12. For this purpose the picker 108 can be equipped with, for example, a mobile data terminal (not illustrated), or a headset (headphone and a data goggle). Alternatively, the picker 108 can walk through the area 12 along the racks 40 with a printed picking list (purchase list of the customer 24), which he carries in paper form.

In the lower right of FIG. 2 picking in accordance with the "goods-to-man" principle is illustrated schematically. In particular, pouch-loading station 52 is shown. In the pouch-loading station 52 empty pouches 16 can be transported to the picker 108 by means of a driven overhead-conveying system 44 for being filled there. In this case the picker 108 does not walk through the areas 12. At the same time, storage containers 54 can be transported (synchronized) via a conventional conveying system (roller conveyor, belt conveyor, overhead conveyor, etc.), or also via the DTV 42, to the picker 108. In this case it is displayed to the picker 108, for example, on a display 56 which articles 14 are to be retrieved from the provided storage container 54. Further, a number of articles 14 to be retrieved can be displayed to the picker 108. Preferably, always one single article 14 is retrieved only, and given into one single pouch 16. However, this procedure requires downstream a sorting process where the (single) articles 14, which have been retrieved in this case in an article-oriented manner, are sorted subsequently in an order-oriented manner. In this case one speaks of a two-stage picking process, or batch picking process.

Instead of providing the storage containers 54, the loading station can also be used for coupling, i.e. preferably by hanging-in, full pouches 16, which have been filled as described above, to the overhead conveyor 22, or to the driven conveyor 44. For this purpose the (collecting) pouches are hangable, as will be described in more detail below.

Alternatively, the (stationary) loading station 52 shown in the lower right of FIG. 2 can also be omitted. This applies generally to all areas 12. The overhead-conveying system 44 can extend through the areas 12, in particular along and parallel to the racks 40, so that the picker 108, who in this case again picks in accordance with the man-to-goods principle, can give the articles 14 retrieved from the rack compartments 38 directly into one pouch 16, which has already been hung-in. It is clear that in this configuration the picking is performed preferably in an order-oriented manner (i.e. in one stage).

Further, it is generally clear that the picking process does not need to be conducted in a manual manner necessarily. Robots (not shown), instead of pickers 108, can also be used which are positioned either at a stationary location (analogously to the pouch-loading station 52) for retrieving and transferring, or which (similar to the DTV 42) are autonomously movable through the areas 12 for getting to the storage locations. The robots are configured to give retrieved articles 14 directly into the pouches 14.

Finally, it is clear that picking is possible in both one stage and two stages. Mixtures thereof are also possible.

As mentioned above, the pouches 16 can be implemented generally by, for example, bags which, for example, are clamped into (not shown) hangers or loops (i.e. adapters) suitable for overhead conveyors. The adapters can be realized by so-called rolling adapters, as exemplarily shown in the documents DE 297 09 545 U1 and DE 297 09 547 U1 which are referred to here. These rolling adapters comprise an opening into which the hanger is hung, which is exemplarily configured to clamp or hang-in the carriers of the pouch 16, or the bag, such that the pouch 16, or the bag, can be filled. The bags can be handed over later directly to the customers 24 although they are automatically transportable by the overhead conveyor 22 (e.g., by the DTV 42, or the overhead-conveying system 44).

Alternatively, (one-way) bags can be positioned in overhead-conveyor specific pouches 16 (cf., for example, DE 10 2011 101 987 A1, DE 10 2011 015 138 A1, or DE 10 2012 018 925 A1), wherein the bags are then retrieved from the pouches 16, and handed over by the driver 58 just at the customers 24. The overhead-conveyor specific pouches 16 are not handed over to the customer 24.

As also explained above, the (one-way) bags can also be transported within the transport receptacles (not shown) through the areas 12. In this case, the transport receptacles are transported, for example, by the DTVs 42 through the installation 11, and in particular through the areas 12. At a later time these bags can be coupled to the overhead conveyor 22 by clamping them, for example, into correspondingly configured hangers. The coupling of the bags to the overhead conveyor 22 is in particular required in case the bags still need to be sorted.

Figure 3:
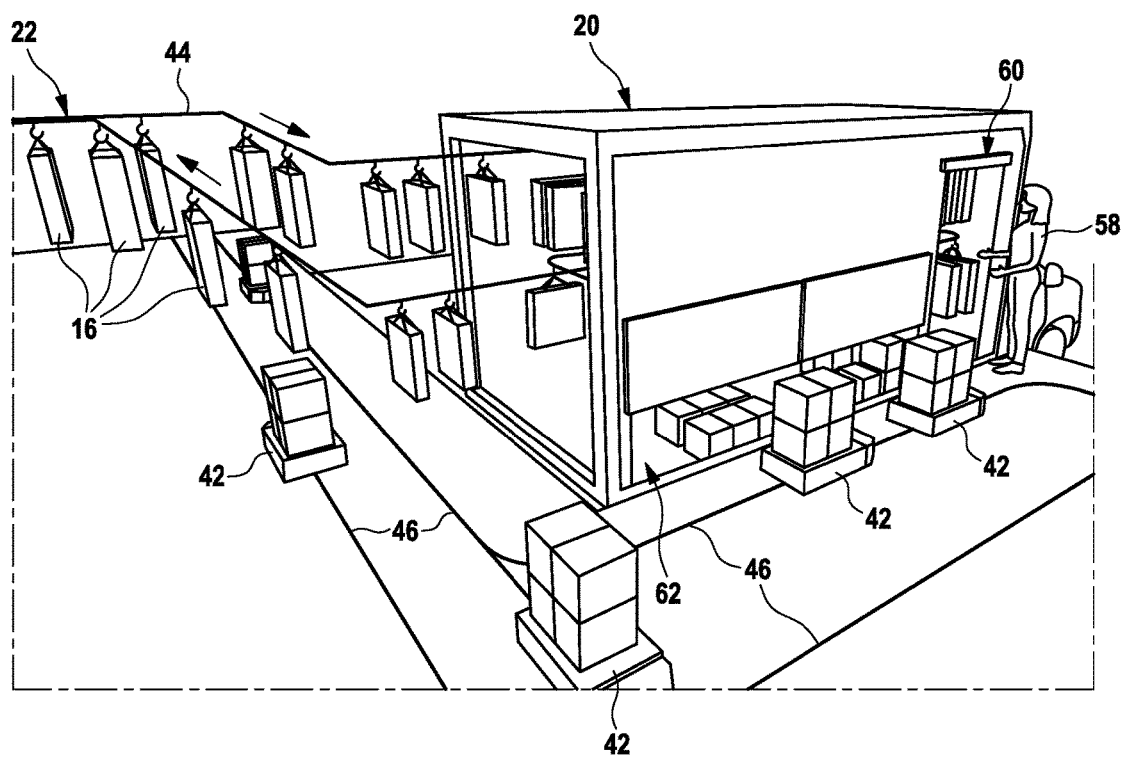
FIG. 3 shows a schematic illustration of a loading process of a delivery vehicle.

FIG. 3 schematically shows transition of the pouches 16 from the installation 11 into one of the delivery vehicles 20. For example, the driven overhead-conveying system 44 is shown used for filling the delivery vehicle 20 with hanging (full) pouches 16 (in an order-oriented manner, but possibly without a sequence yet). Empty pouches 16 can also be unloaded from the delivery vehicle 20 by the driven overhead-conveying system 44.

It is clear that for the purpose of loading the DTVs 42 including the frames 48 can be used alternatively or in addition. In the example of FIG. 3 the DTVs 42, for example, only deliver non-pouchable articles, such as beverage boxes, to the delivery vehicle 20 and take away empties on their way back.

The delivery vehicle 20 is provided, alternatively or in addition to the driven conveyor 44, with (passive) rails (not illustrated). The pouches 16 can be pushed from the overhead conveyor 22 of the installation 11 onto the rails. In this case, the equipping of the rails is preferably conducted already in a tour-oriented manner. This means that the pouches 16 in this case are loaded into the delivery vehicle 20 in the delivery sequence (FIFO, first in first out), like they are unloaded later by the driver 58 at the customers 24.

If the delivery vehicle 20 is also provided with a driven overhead-conveying system 44, being provided separately to the overhead-conveying system 44 of the installation 11 but capable of being coupled to the overhead-conveying system 44 of the delivery vehicle 20, then the tour sorting can also be conducted while the delivery vehicle 20 drives to the customer 24. Even during the drive between two different customers 24 sorting can be conducted. In this case the sorting is conducted such that the pouches 16 of the next customer 24, who gets just delivered, are retrievable (in an order-oriented manner) at the retrieval opening 60 of the delivery vehicle 20.

It is clear that the loading of the delivery vehicle 20 with the pouches 16 can alternatively also be conducted manually. The pouches 16 do not need to be provided by an overhead conveyor 22 for loading the delivery vehicle 20. The pouches 16 can also be transported, for example, in the above-mentioned transport receptacles to the delivery vehicle 20 where the driver 58 hangs the pouches 16 into the above-mentioned rails, and/or into the driven circulating overhead-conveying system 44 of the delivery vehicle 20.

In addition to the retrieval opening 60 for the hanging pouches 16 one or more loading/unloading openings 62 can be provided for the non-pouchable articles. In the example of FIG. 3 these openings 62 are arranged, for example, in a lower lateral region of a storage space of the delivery vehicle 20 so that the DTVs 42 can, preferably (partially) automated, load and unload the delivery vehicle 20 with the non-pouchable articles.

As already mentioned above, the pouches 16 which are used within the installation 11, and if necessary also in the delivery vehicles 20, are identical to the delivery pouches which are handed over to the customers 24, in order to have the pouches at their free disposal. This means that within the entire system 10 preferably one single type of pouches 16 is used only, wherein the pouches 16 do not necessarily need to be given back by the customer 24 to the operator of the system 10. In particular, these delivery pouches are suitable for conveying systems. This means that the delivery pouches can be coupled to existing overhead conveyors 22. It is of less significance whether the coupling occurs directly, or indirectly via an adapter.

A particular advantage is to be seen in that the pouches 16 are transported exclusively in a hanging manner throughout the entire process. These measures reduce number of handlings being associated with the transfer of the pouches 16 between different transport and conveying systems. Preferably, the articles 14 are "touched" actively during the picking process only. All other steps are preferably conducted automatically.

The use of a driven overhead-conveying system 44 within the installation 11, in particular within the areas 12 and/or 18, as well as within the delivery vehicles 20 represents a particular advantage. The picker 108 and/or driver 58 neither needs to carry the articles 14, nor needs to push them. The pickers 108 can pick the articles 14 directly into the pouches 16.

The drivers 58 neither need to sort the pouches 16, nor need to reload them. The drivers 58 can retrieve the pouches 16 already in the right sequence from the retrieval opening 60, at the latest when the driver 58 has arrived at the customers 24. If pouches 16, which can be used globally, are not to be used, it goes without saying that the driver 58 can reload the articles, which have been picked into the pouches 16, also at the location of the retrieval opening 60.

Another advantage is to be seen in a pouch 16 which can be cooled. As mentioned in the introduction, the pouches 16 can be equipped with an integrated cooling system 34. The integrated cooling system 34 can comprise a plurality of lines within the walls of the pouch 16. Coolant, which is cooled at a remote location and can be exchanged against coolant being contained (in a warm condition) in the pouch 16, can be directed through the lines.

Another advantage of the use of pouches 16 is to be seen in that the pouches 16, and the picked articles 14, can be compacted. Higher storage and transport density can be achieved in comparison to conventional containers. For example, pouches 16 can be used, which are formed of different lengths, so that the articles 14 in the filled pouches 16 can be located at different heights. In this manner spaces can be used for compaction, which are not available when conventional transport receptacles (or pouches 16 of one single length) are used. Also, contact between cooled and non-cooled articles 14 can be prevented.

It goes without saying that the same advantage also applies within the delivery vehicles 20. In particular, the delivery vehicles 20 are equipped with an overhead-conveying system 44 which is arranged at multiple planes, on top of each other and below each other.

Preferably, the articles 14 can already be configured such that they are capable of being hung. This means that the articles 14 can also be coupled directly—without pouches 16—to the overhead conveyor 22. A six-pack of beverage cans may be provided additionally with, for example, a transport lug for coupling the beverage carrier directly to the overhead conveyor 22. In this case the beverage carrier is handled like a pouch 16.

The delivery vehicles 20 can be loaded and unloaded extremely fast when overhead conveyors 22 are used. In particular, the loading and unloading processes are performed automatically.

Figure 4:
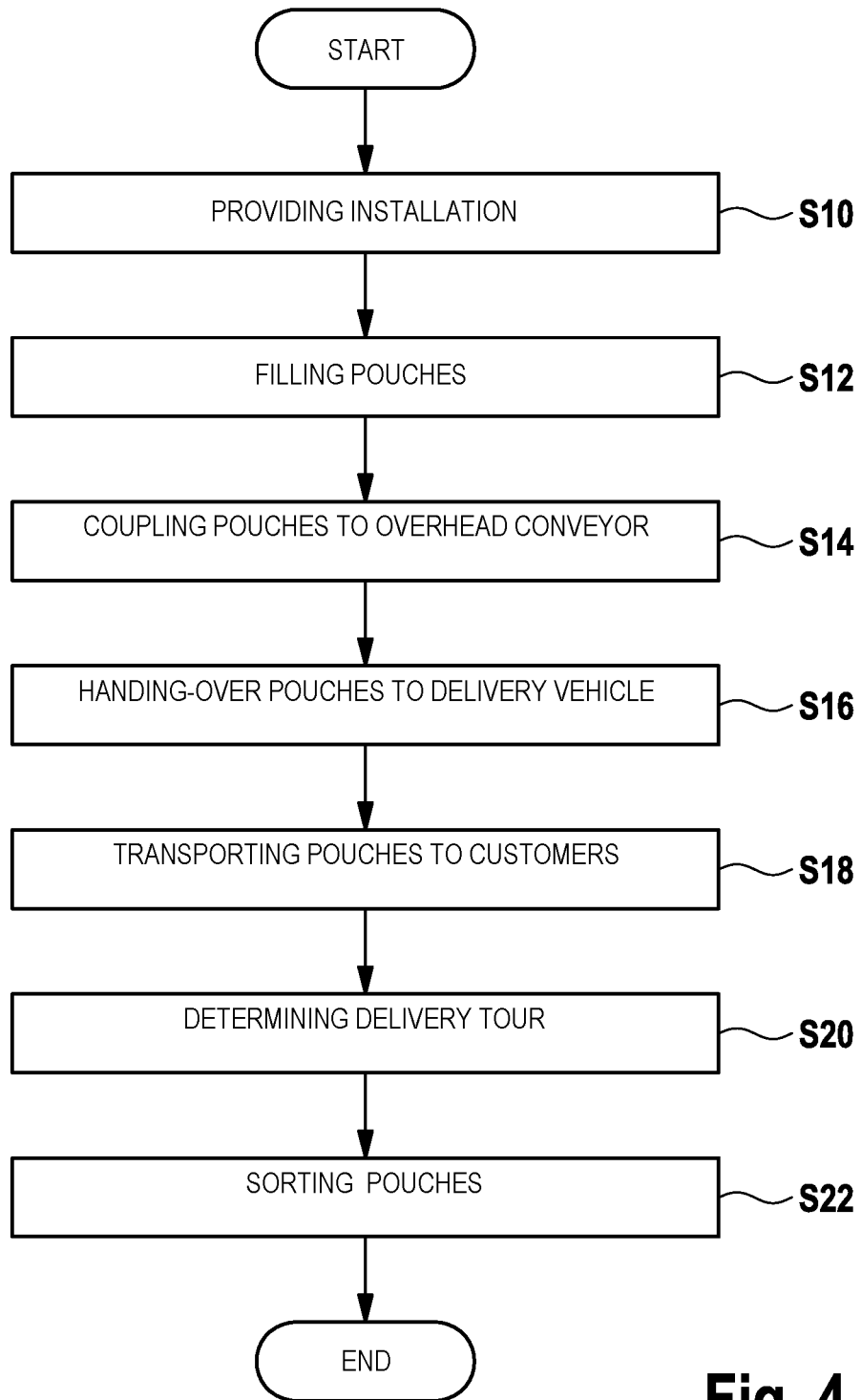
FIG. 4 shows a flow chart of a method for picking and delivering.

FIG. 4 shows a flow chart of a method for picking and delivering articles 14 according to a plurality of orders from customer 24, wherein the orders comprise pouchable articles 14 of an online supermarket, which have been ordered by the customers 24. The illustrated sequence of steps is not fixed. The sequence can be changed, and in particular depends on whether and which conveying system is used in installation 11, and in which manner picking (man-to-goods, goods-to-man, one stage, two-stages, batch picking, pick-by-light, etc.) is performed in the installation 11.

In a first step S10 the storage and picking installation 11 is provided where the articles 14 of the online supermarket are stored in, preferably different, storage and picking areas 12.

The installation 11 is configured as explained above. The areas 12 differ in particular in the types of articles being stored and picked there. For example, cooled products need to be stored at deep temperatures as dry products. Cooling is technically extravagant, and more expensive. Different products, such as cigarettes, need to be protected against thefts. Other products need to be protected against unauthorized access.

In a further step S12 the pouches 16 are filled with the ordered articles 14, according to the orders, in the storage and picking areas 12. Preferably, at this time the pouches 16 are already hanging on the overhead conveyor 22, which in particular extends through all areas 12, so that the pouches 16 can be filled successively in all areas 12. However, the pouches 16 can also be filled in a different state, for example, when sitting in a container.

In step S14 the pouches 16 are coupled to an overhead conveyor 22. This can be done before the filling, or after the filling.

This can also be done during handing over to a delivery vehicle 20.

In step S16 the filled pouches 16 are handed over to the delivery vehicle 20 which is configured to transport the pouches 16 in a hanging manner.

In step S18 the hanging pouches 16 are transported to the customers 24 by means of the delivery vehicle 20.

In step S20 a delivery tour is determined by means of a controlling device 28, wherein the delivery tour defines a sequence in which the customers 24 are delivered by the delivery vehicle 20 for handing over the pouches 16 including the articles 14, which have been ordered by the customers 24, to the customers 24.

This step can be the first step at all. The controlling device can in advance analyze all received customer orders according to the delivery locations (i.e. according to the places of residence of the customers 24) for determining, for example, a path-optimized delivery tour (navigation route). In this context, delivery times desired by the customers 24 and the like can also be considered, wherein in this case the tour in most cases is no longer path-optimized (but time-optimized). In particular, the delivery tour sets all subsequent processes (picking, delivery vehicle, etc.).

In step S22 the filled pouches 16 are sorted, by f the overhead conveyor 22, according to the delivery route.

This sorting can be performed in the installation 11, and/or in the delivery vehicle.

In a step, which is not illustrated, the filled pouches are then handed over by the driver 58 of the vehicle 20 to the customer.

Then, the method ends.

Figure 5:
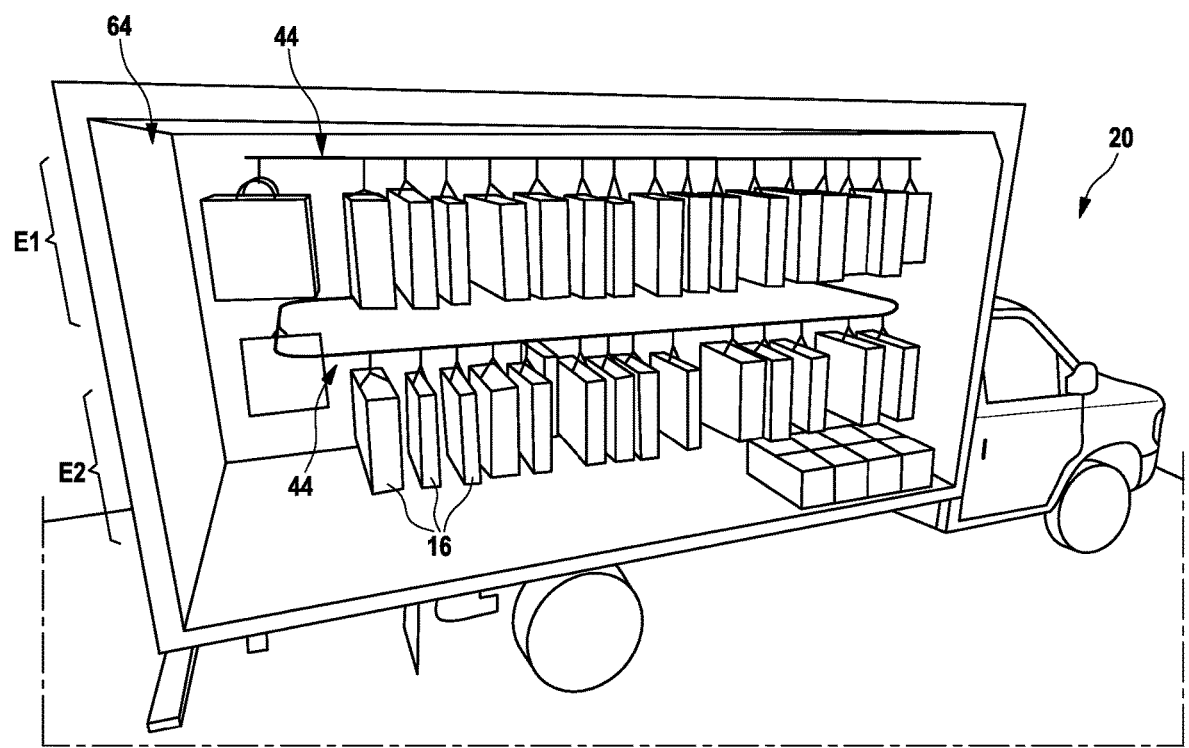
FIG. 5 shows a broken-up side view of a delivery vehicle.

FIG. 5 shows a broken-up side view of an exemplary delivery vehicle 20 comprising a driven overhead-conveying system 44 being independent of the overhead-conveying system 44 of the installation 11. The delivery vehicle 20 alone represents an independent invention.

Within a storage space 64 of the delivery vehicle devices for hanging the (filled) pouches 16 are provided. The devices can be realized by passive rails (not illustrated), and/or at least by one driven overhead-conveying system 44.

The overhead-conveying system 44 for the delivery vehicles 20 can be moved into each of the vehicles 20 in one piece as one module, and coupled there mechanically and electrically. This can be a unique installation process, and/or occur as an always recurring (fast) process, in order to allow employing different subcontractors. If desired, these overhead-conveying system modules can also be already equipped with pouches 16 for the delivery.

In FIG. 5 two overhead-conveying systems 44 are provided at different planes E1 and E2 for using full capacity of the storage space 64. Each of the overhead-conveying systems 44 is preferably closed, and can comprise one or more branch lines (not shown) for allowing performance of sorting processes. It is clear that also one single conveying system 44 may be provided only. Alternatively, more than two overhead-conveying systems 44 can be provided, in particular for allowing cooled and non-cooled areas, which are spatially separated from each other, within the storage space 64. Preferably, the overhead-conveying systems 44 are (vertically) connected to each other for allowing mutual exchange of pouches 16.

Beneath the plane E2 there is sufficient space for storing and transporting non-pouchable articles, such as beverage boxes, on the bottom of the storage space 64. In general, each space within the storage space 64 can be used for storing and transporting non-pouchable articles. Non-pouchable articles can also be (postal) packages of external delivery-service providers.

Further, the delivery vehicle 20 is provided with interfaces (not illustrated) for coupling to the overhead-conveying system 44 of the installation 11 to the overhead-conveying system 44 of the vehicle 20 in order to automatically fill the vehicle 20 with the pouches 16.

The delivery vehicle 20 is provided further with a control (not shown) for allowing automatic sorting of the pouches 16, in particular during driving to the customers 24.

The storage bay 64 of the vehicle 20 may also be formed as a separable container which can be used as a mobile (i.e. not stationary) temporary transfer station. The container may be placed, for example, in residential areas, at airports, in parking garages, at public-transportation stop stations, and at other locations so that the customers 24 can personally retrieve their orders at the retrieval opening 62 (e.g., via a code). The retrieval opening 62 is to be formed correspondingly (interaction terminal, power supply, etc.). In this case the integrated overhead-conveying system 44 is to be provided with a sorting functionality because sequence is not predictable in which the customers 24 retrieve their orders.

Hereinafter, advantages of the above-described system 10 and/or method are summarized once again.

One-touch strategy:
direct picking into delivery pouches (in all areas 12);
picking vehicles 110 are omitted;
transport boxes, and thus reloading processes, are omitted;
prefilling of transport boxes with bags or pouches 16 is omitted;
handling of empty transport containers, in particular taking back the same, is omitted; and
labelling is reduced.

Optimized picking:
use of DTVs 42 in large-dimensioned areas 12 (long walking paths for the pickers 108 are eliminated by zone picking, wherein the areas 12 are divided into zones which can be operated flexibly, or on demand of pickers 108);
increase of access rate for the pickers 108, and shortening lead times;
optimized and dynamic prioritization of orders;
direct buffering, storing, and sequencing in the respective (cooling) areas 12; and
gentle handling of articles, and reduction of reloading processes.

Replenishment/subsequent delivery processes:
(partially) automated replenishment (transport, provision, assignment) by means of the DTVs 42;
guiding the pickers 108 by means of a portable data terminal (e.g. pick-by-watch); and putting the articles into the storage devices within the areas 12, including waste disposal (by means of the DTVs 42).

Technology and logistics:
overhead conveyor 22 for consolidation, buffering, storing, and/or sequencing or sorting (delivery vehicle 20 and/or tour);
buffering of already picked cooled articles 14 is performed directly within the cooled areas 12;
identifying, tracking, sorting back, and/or documenting by means of identification markers in or on the pouches 16;
automatic sorting according to delivery vehicles 20 and delivery tours directly before the loading of the vehicles 20;
very fast loading and unloading of the vehicles 20;
use of special pouches 16 (e.g., including cooling system 34, upholstery, inlays, etc.) is possible;
handling of cold pack is omitted; and
significant improvement of the volume-utilization rate.

Delivery:
delivery vehicles 20 configured for transporting the pouches 16 in a hanging manner so that sorting gets easier;
optimal floor plan (pouches 16, cartons, beverage boxes, bulky goods, etc.) possible in the storage space 64;
sorting possible during the drive;
provision of the articles 14 ergonomic for the driver 58 at the customers 24 so that in particular stopping time is shortened; and
very short automatic unloading of the vehicles 20.

LIST OF REFERENCE NUMERALS

10 system for picking and delivering
11 storage and picking installation
12 storage and picking area
14 article
16 pouches
18 sorting area
20 delivery vehicle
22 overhead conveyor
24 customer
26 door
28 controlling device
30 cleaning station
32 cooling device
34 cooling system
36 cooling aggregate
38 rack compartment
40 rack
42 driverless transport vehicle (DTV)
44 overhead-conveying system
46 traveling path
48 frame
50 transport area
52 pouch-loading station
54 storage container
56 display
58 driver
60 retrieval opening
62 loading/unloading opening
64 storage space
100 storage and picking system (PRIOR ART)
102 goods-receipt area
104 storage and picking area
106 rack
108 picker
110 picking vehicle
112 cooled box
114 deep-freeze box
116 area for consolidation+sorting
118 area for tour sorting
120 delivery

The invention claimed is:
1. A method for picking and delivering pouchable articles according to a plurality of orders from customers, wherein the orders comprise the articles, which have been ordered by the customers from an online supermarket, the method comprising the steps of:
providing a storage and picking installation comprising storage and picking areas, wherein the articles are stored in the storage and picking areas;
filling pouches with the ordered articles in the storage and picking areas according to the orders;
coupling the filled pouches to an overhead conveyor in the storage and picking installation;

handing over the filled pouches to a driven overhead-conveying system inside a delivery vehicle;

transporting the filled pouches in a hanging manner with the delivery vehicle to the customers;

wherein a delivery tour is determined by moans of a controlling device, wherein the delivery tour defines a sequence in which the filled pouches are to be delivered by the delivery vehicle to the customers for handing over to the customers the filled pouches including the ordered articles; and wherein the filled pouches are sorted by the overhead conveyor in the storage and picking installation or by the driven overhead-conveying system in the vehicle according to the delivery tour.

2. The method of claim 1, wherein the filled pouches are sorted by the driven overhead-conveying system in the delivery vehicle according to the delivery tour.

3. The method of claim 1, wherein the pouches are transported in a hanging manner through the storage and picking installation while the pouches are filled with the articles in accordance with the customer orders, and the filled pouches are handed over in a hanging manner to the driven overhead-conveying system inside the delivery vehicle.

4. The method of claim 1, wherein the step of coupling the pouches to the overhead conveyor occurs as the filled pouches are handed over to the delivery vehicle.

5. The method of claim 1, wherein the filled pouches are sorted further within the installation to different delivery vehicles having different delivery tours.

6. The method of claim 1, wherein only a single type of pouch is used in all steps, and wherein the type of pouch is coupleable via an adapter to the overhead conveyor.

7. The method of claim 1, wherein the filled pouches are merged by the overhead conveyor so that all pouches belonging to the delivery tour can be commonly handed over to the delivery vehicle.

8. The method of claim 1, wherein the system further comprises a plurality of storage and picking installations, each being operated by different operators, the different operators serving different customers, and the step of transporting the filled pouches to the customers by the different storage and picking installations comprises:

transporting the filled hanging pouches from the storage and picking installations to a distribution center by different delivery vehicles;

sorting the filled pouches from the storage and picking installations in the distribution center according to operator specific delivery tours;

loading the delivery vehicles according to the operator-specific delivery tours; and transporting the filled pouches, by the delivery vehicles, from the distribution center directly to the customers according to the determined operator specific delivery tours.

9. A system for picking and delivering pouchable articles according to a plurality of orders from customers, wherein the orders comprise the pouchable articles, which have been ordered by the customers from an online supermarket, the system comprising:

a storage and picking installation comprising at least one storage and picking area, wherein pouches are filled with the articles in the at least one storage and picking area according to the orders;

an overhead conveyor system for configured to sort the filled pouches according to a delivery tour, the overhead conveyor system including:

an overhead conveyor in the storage and picking installation, and a driven overhead-conveying system in at least one delivery vehicle configured to transport the filled pouches in a hanging manner on the driven overhead-conveying system; and a controlling device configured to determine the delivery tour, wherein the delivery tour defines a sequence in which the filled pouches are to be delivered by the at least one delivery vehicle for handing over to the customers the filled pouches including the ordered articles.

10. The system of claim 9, wherein the driven overhead-conveying system within the delivery vehicle is configured to sort the filled pouches according to the delivery tour.

11. The system of claim 9, wherein the overhead conveyor in the storage and picking installation is configured to sort the filled pouches according to the delivery tour.

12. The system of claim 11, wherein the system further comprises a driverless transport system including driverless transport vehicles, the driverless transport vehicles being configured to transport the filled pouches in a hanging manner.

13. The system of claim 9, wherein the filled pouches are couplable to the overhead conveyor.

14. The system of claim 9, wherein the pouches are multi-way bags, each comprising an integrated cooling system.

15. The system of claim 13, wherein the pouches are configured as one-way bags.

* * * * *